United States Patent
Becker et al.

(10) Patent No.: US 6,449,875 B1
(45) Date of Patent: Sep. 17, 2002

(54) METHOD OF HEATING BULK MATERIAL, ESPECIALLY GRANULAR PLASTIC MATERIAL

(75) Inventors: Achim Becker, Darmstadt; Michael Zlotos, Lauffen, both of (DE)

(73) Assignee: Mann & Hummel Protec GmbH, Ludwigsburg (DE)

( * ) Notice: Subject to any disclaimer, the term of this patent is extended or adjusted under 35 U.S.C. 154(b) by 0 days.

(21) Appl. No.: 09/488,822

(22) Filed: Jan. 21, 2000

(30) Foreign Application Priority Data

Jan. 21, 1999 (DE) .......................... 199 02 327

(51) Int. Cl.$^7$ ................................. F26B 3/14
(52) U.S. Cl. ................ 34/491; 34/493; 34/495; 34/507; 34/550
(58) Field of Search .............. 34/443, 491, 493, 34/494, 495, 507, 549, 550, 553, 573, 575

(56) References Cited

U.S. PATENT DOCUMENTS

| | | | | |
|---|---|---|---|---|
| 3,861,054 A | * | 1/1975 | Stahl ........................ | 34/359 |
| 4,441,261 A | * | 4/1984 | Beckmann ................. | 34/428 |
| 4,633,593 A | * | 1/1987 | Wallis ....................... | 34/475 |
| 4,750,273 A | * | 6/1988 | Parkes et al. ............. | 34/484 |
| 5,019,994 A | * | 5/1991 | Rainville .................. | 34/484 |
| 6,233,842 B1 | * | 5/2001 | Geelen ....................... | 34/360 |

FOREIGN PATENT DOCUMENTS

| | | |
|---|---|---|
| DE | 1 241 366 | 5/1967 |
| DE | 31 31 471 | 9/1982 |
| DE | 33 20 978 | 12/1983 |
| DE | 38 09 749 | 4/1989 |
| DE | 39 29 858 | 3/1991 |
| DE | 39 36 008 | 5/1991 |
| DE | 40 15 001 | 11/1991 |
| DE | 42 34 696 | 5/1993 |
| DE | 42 36 309 | 5/1994 |
| DE | 296 21 313 | 1/1997 |
| EP | 0 487 829 | 6/1992 |

* cited by examiner

Primary Examiner—Jiping Lu
(74) Attorney, Agent, or Firm—Crowell & Moring LLP

(57) ABSTRACT

A method for heating bulk materials, especially granular plastic material, in which the bulk material is fed to a vessel and exits the vessel based on the consumption. A heat-transfer gas flow is simultaneously fed to the vessel and conducted either cocurrently with or countercurrently to the flow of granular material. The gas inlet temperature or quantity of gas are thereby varied in such a way that the temperature of the granular material at the outlet corresponds to a target temperature value required for the granular material.

5 Claims, 3 Drawing Sheets

METHOD OF HEATING BULK MATERIAL, ESPECIALLY GRANULAR PLASTIC MATERIAL

BACKGROUND OF THE INVENTION

The invention relates to a method for heating up bulk materials, in particular granular plastic material.

German Patent Specification DE 31 31 471 discloses a method in which bulk material is heated up and dried in a drying vessel. For that purpose, chambers are provided which are filled with adsorbing agents. The dry air is fed to the drying vessel in a closed circuit, wherein the chambers are regenerated by a second air circuit at time intervals. In order to dry the bulk material, the dried air is heated, passed through the bulk material, and it is then dried again.

In addition, two drying methods for drying granular material are described in the special edition "MASCHINEN-MARKT" (= "Machines on the Market"), 81st year, vol. 90, dated Nov. 11, 1975. The first of these involves using hot-air driers; the second involves using dry-air driers. Hot-air driers are not suitable for drying hygroscopic granular material, because, in this case, the drying process depends upon the humidity of the ambient air. In addition, the energy balance of the hot-air driers is negative, because the heat contained in the outgoing air is lost to the drying process. In principle, bulk material driers of this kind are also suitable for heating up granular plastic material. However, the disadvantage of such bulk-material drying plants is that the residence time of the bulk material in the drying vessel is relatively long and thus there is a danger that the bulk material, in particular granular plastic material, will be thermally damaged.

SUMMARY OF THE INVENTION

It is therefore the object of the present invention to avoid the aforementioned disadvantages and to provide a process for heating bulk material, especially granular plastic material, which treats the material gently and which can be used in an economical way.

This object is achieved by the invention as described and claimed hereinafter.

The present invention has the advantage that a vessel is selected for the bulk material and the bulk material is passed through the vessel in a quasi-continuous manner. Depending on the granular size of the bulk material, a minimum residence time in the vessel is required in order to thoroughly heat the material to the core. Based on calculations, the theoretical residence time, for example, with conventional granular plastic materials amounts to a few seconds, so that it is advantageous to strive for a residence time of approximately 2 to 5 minutes.

In accordance with the invention, various alternative processes are described herein. It is thus advantageous to guide the material flow and the heat-carrying gas flow in parallel and to vary the gas inlet temperature in such a way that the material outlet temperature corresponds to the required temperature. It is likewise possible to vary the quantity of gas instead of the gas inlet temperature, so that the material outlet temperature corresponds to the required temperature.

The process for heating bulk materials according to the present invention is characterized by the fact that the heat-transfer gas flow and the final temperature of the material to be heated are not thermally balanced. Therefore, the temperature of the gas flow is substantially higher than the final temperature of the material to be heated.

As an alternative to the processes described above, the heat-transfer gas flow can be conveyed countercurrently to the direction of the material flow. In this case there are again two practicable variations of the process. The first is to control the gas inlet temperature, and the second is to control the quantity of gas in such a way that the material outlet temperature corresponds to the required temperature.

Another embodiment of the invention envisions varying the gas temperature or the quantity of gas in the exhaust of the heat-transfer gas, i.e. in the exhaust air duct for the heat-transfer gas, by means of a temperature sensor provided for measuring the temperature of the exhaust air, so that the temperature of the material can be determined from the measured temperature.

A further embodiment of the invention envisions determining the control variable for varying the gas temperature or quantity of gas by means of a material temperature sensor which is disposed in a lower region of the vessel through which the gas does not flow.

To optimize the overall process and to avoid heat losses from the material, another embodiment of the invention envisions providing the vessel with a so-called dynamic insulation. This is achieved by guiding the outgoing process air, i.e. the exit air, over the outer surface of the vessel. For this purpose, the vessel is provided with a second, outer jacket.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail whereinafter with reference to illustrative preferred embodiments shown in the accompanying drawings in which.

DETAILED DESCRIPTION OF PREFERRED EMBODIMENTS

Figure 1:
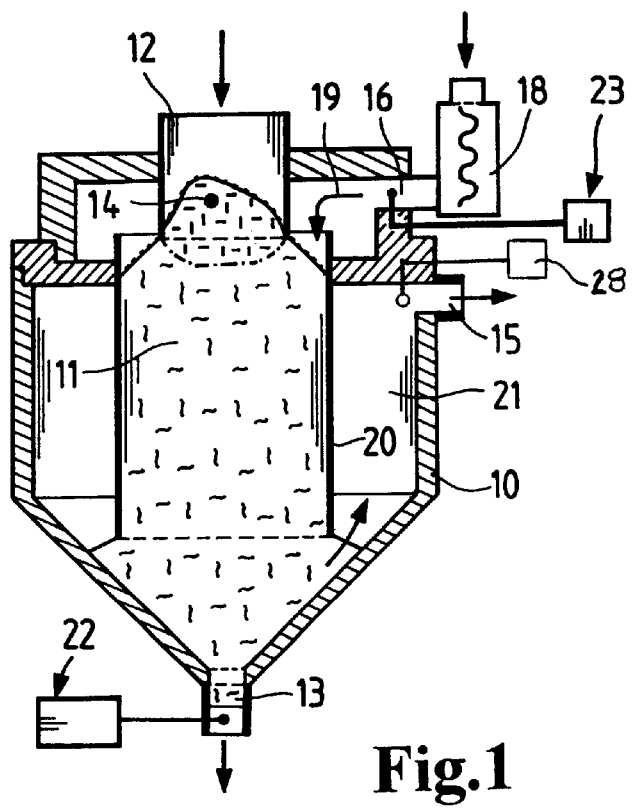
FIGS. 1 to 4 show different variations of an apparatus suitable for heating and/or re-heating bulk materials.

The apparatus and method for heating and/or reheating (afterheating) bulk materials is especially suitable for granular plastic materials, which, for example, after subjection to a drying process, must be heated up to higher temperatures, whereby in a drying process using dry air as the heat-transfer medium, it is possible to use a partial stream of the dry air, and this partial stream is guided in the process in a circuit parallel to the quantity of the dry air.

In contrast to the currently applied methods for achieving such an object, which use process gases having a temperature which corresponds to the final temperature of the plastic material to be heated, it is possible to use substantially smaller quantities of air for the afterheating process. The energy balance of the entire process according to the present invention is particularly positive.

A comparison with conventional processes reveals the following differences:

One object resides in heating a quantity of 100 kg granular plastic material from a storage temperature of 20° C. up to a drying temperature of 140° C. and in drying the same, wherein the ideal processing temperature lies at 170° C. Due to long drying times, the granulate must be dried for 6 hours at this temperature before it will get dry. This is not possible because thermal degradation may occur.

Up to now, the material has been introduced into a drying vessel having a volumetric capacity of 600 kg (6 hours×100 kg), through which air is continuously passed in a quantity depending upon the specific heat of the plastic material, for example, 160 $Nm^3/h$ and at a temperature of 140° C. Thereafter, the material is conveyed into a afterheating vessel, in which the air temperature corresponds to the afterheating temperature of 170° C. Since the mean specific heat of the granular material between 140° C. and 170° C. is higher than between 20° C. and 140° C., and since the exhaust air temperature ideally is equal to the material inlet temperature, it is necessary that the air throughput amount in the afterheating hopper be somewhat higher than in the preceding drying process. The consequence of this is that the quantity of air for the afterheating process amounts to at least 180 $Nm^3/h$. Since with hygroscopic plastic materials, especially with polyethylene terephthalate (PET), the afterheating process must take place under a dry atmosphere, both return air streams should be combined and dried in an adsorption drier. The problem in this is the average temperature of the overall return air, since the adsorption capacity of dry-air driers based on zeolites is temperature dependent. The total quantity of air, which has an average temperature of about 85° C., must be cooled down to a temperature of approximately 40° C. before it is dried by the zeolite. After drying, the respective partial streams then must be heated again to the process temperatures.

According to the proposed method, the temperatures and air quantities used for the drying process are identical to the calculation described above, i.e., the drying temperature amounts to 140° C. and the afterheating temperature to 170° C. A difference, however, is the quantity of air required for the afterheating process; in this case it amounts to only 30 $Nm^3/h$. The process exit air which results depends upon the selected method, however it will not exceed 170° C. This results in an average overall air temperature of the exhaust air of 45° C., so that a considerable saving in energy for the cooling and for the heating process will become apparent.

The target or control variable of the overall process is the constant discharge temperature of the outgoing granular material for a subsequent process. Depending on the process which is used, this temperature is detected and regulated in the stream of granular material in the case of a concurrent flow process by a temperature sensor 28 in the outgoing gas stream, and in the case of a countercurrent flow process by a temperature sensor in a lower region of the vessel through which the gas does not flow.

FIG. 1 shows a vessel 10 in which there is a granular plastic material 11. The granular plastic material is fed to the vessel through the upper charging hopper 12. A material-discharging port 13 is provided in the lower region of the vessel through which the material can be fed directly to a metering screw or to a lock. It is also possible to connect the vessel 10 directly to a plasticizing unit. The granular plastic material 11 to be heated flows through the vessel 10, with the heat-transfer gas not flowing through the upper region of the vessel. In this upper region the inlet temperature of the granular plastic material is measured by a temperature sensor 14. The heat-transfer gas flows through the underlying, larger region of the vessel 10, and in this region the temperature of the granular material is adjusted to the desired final temperature. As already mentioned, the granular material leaves the vessel through a suitable discharge element.

The vessel further has a gas outlet nozzle 15, through which the heat-transfer gas escapes from the vessel, as well as a gas inlet nozzle 16, through which the required gas is introduced. Requirements of the heating process include a quasi-continuous flow of the granular material through the vessel as well as the insulation of the outer jacket of the vessel in order to maintain the temperature of the granular material at a uniform level. Depending on the size of the granular material, a minimum residence time in the vessel is necessary in order to heat the granules through to the core. In practice the residence time lies in the range from 2 to 5 minutes. The gas which is supplied, is heated to the required temperature in a heating unit 18. The heated gas then flows through the granular material as shown by arrow 19 and passes between internal wall 20 of the vessel and the funnel-like section of vessel 10 into the outer region 21 of the vessel and from there to the gas outlet nozzle. Thus, in this case the heat-transfer gas is conducted parallel to the flow of granular material.

A temperature sensor 22 is arranged at the material outlet nozle 13 in order to sense the material outlet temperature. Another temperature sensor 23 is likewise arranged at the gas inlet nozle 16 in order to sense the gas inlet temperature. Both sensor signals are linked and based on the combination the gas inlet temperature is varied in such a way that the material outlet temperature corresponds to the target temperature. The gas inlet temperature may also be varied in response to the temperature of the heat transfer gas exhaust measured by a temperature sensor 28 at the gas outlet.

Figure 2:
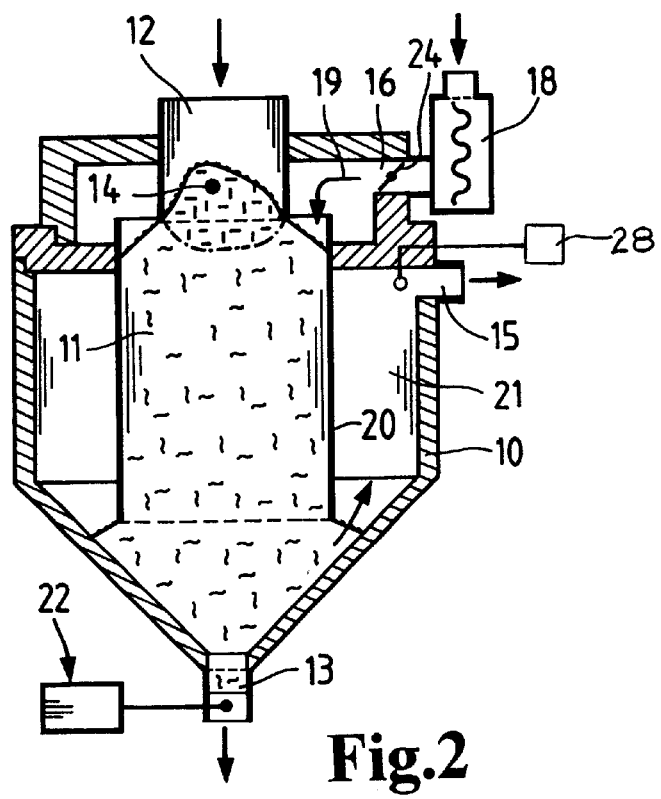

FIG. 2 shows the vessel illustrated in FIG. 1, but having a somewhat modified control philosophy. Like parts are identified by the same reference numerals. A throttle valve 24 is provided in the gas inlet nozzle 16 in order to control the quantity of gas. Depending on the material outlet temperature which is measured by temperature sensor 22, and/or on the gas outlet temperature measured by temperature sensor 28, the quantity of gas is regulated by the throttle valve 24 in such a way that in this case too—as in the embodiment according to FIG. 1—the material outlet temperature corresponds to the target temperature.

Figure 3:
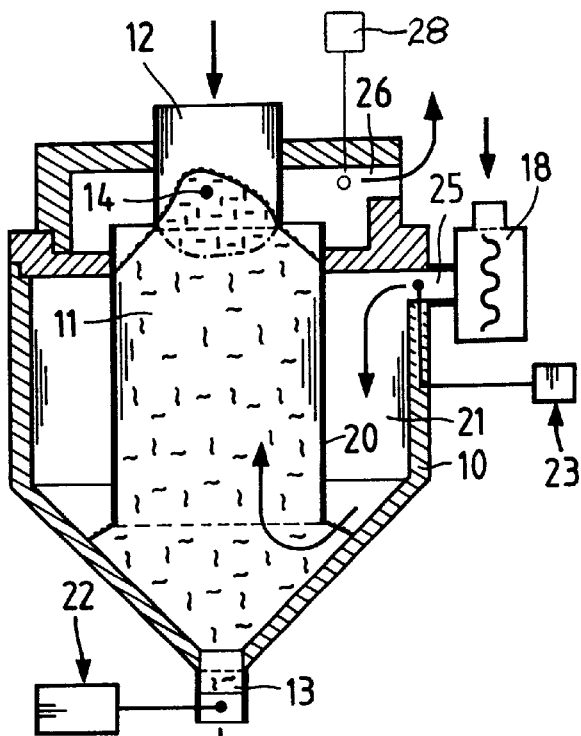

FIG. 3 shows another variation. In this case, the heat-transfer gas flow is conducted in the direction opposite the direction of the material flow. The gas flow passes through the inlet nozzle 25 into the outer region 21, flows from the bottom toward the top through the granular material supplied from above, and subsequently leaves the vessel via the gas outlet nozzle 26.

Figure 4:
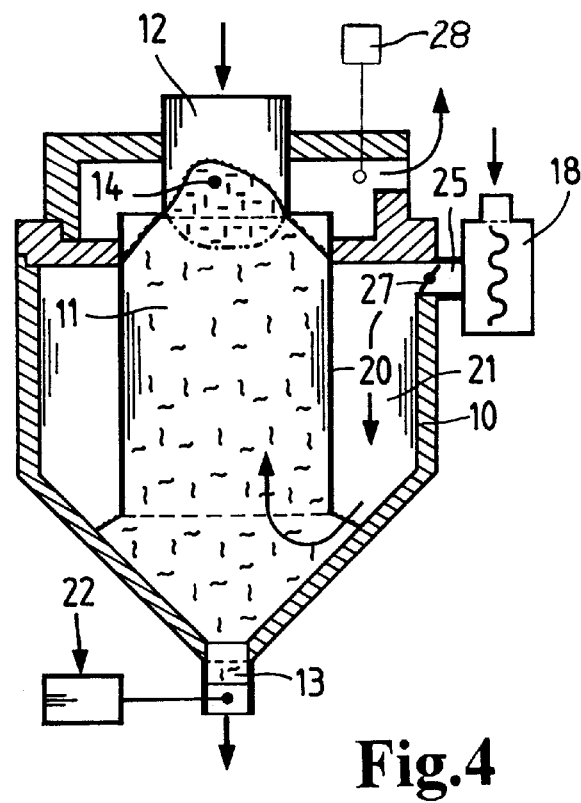

FIG. 4 likewise shows the same countercurrent flow principle illustrated in FIG. 3, wherein the quantity of gas is varied by means of a throttle valve 27 arranged in the gas inlet nozzle 25 in such a way that the material outlet temperature, which is measured by the temperature sensor 22, corresponds to the target temperature.

Figure 5:
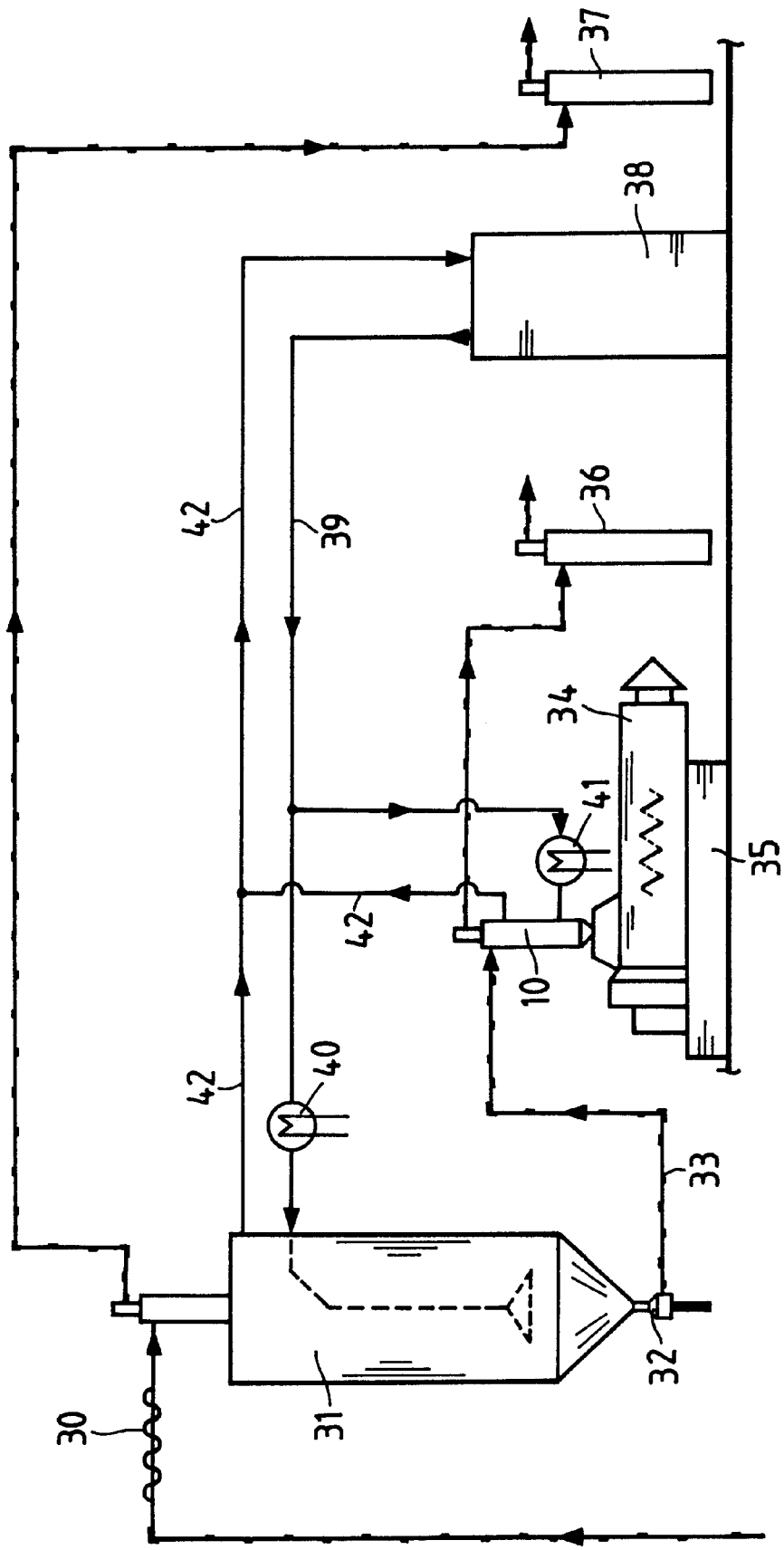
FIG. 5, shows an overall diagram of a plastic-processing plant.

FIG. 5 shows an overall diagram of a plastic processing plant. Granular plastic material is supplied through a line 30 to a plastic-drying hopper 31. From there, it passes through discharge lock 32 and line 33 to the vessel 10. This vessel is arranged directly above the plasticizing screw 34 of an injection molding machine 35. A vacuum unit 36, 37 for transporting the granular plastic material is connected both to the drying hopper 31 and to the vessel 10. A drier 38 produces dry air, and supplies the dry air via line 39 both to vessel 10 and to plastic-drying hopper 31. Before entering the granular plastic material, the dry air is heated to the appropriate temperature by heating devices 40, 41. The exhaust air from the vessel 10 and from the plastic-drying hopper 31 passes through the line 42 back again to the drier 38, which carries out a drying operation in a closed circuit.

Within the framework of this plastic-drying plant, it is possible to provide vessel 10 with the same connections and configurations described with reference to FIGS. 1 to 4, so that an optimal drying process and a rapid and material-sparing heating of the bulk material, e.g. a granular plastic material, is assured.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A method of heating a bulk material, said method comprising the steps of:

supplying the bulk material to a chamber of a single-staged heating vessel through a material inlet and withdrawing bulk material from the vessel through a material outlet at a throughput rate based on consumption of the material in a subsequent processing step;

introducing a single flow of heat transfer gas through a gas inlet into said chamber of the single-staged heating vessel and passing the heat transfer gas through the heating vessel in contact with the bulk material; said heat transfer gas being passed through said vessel at a constant rate per unit of time; and regulating the temperature of said heat transfer gas introduced through said gas inlet in response to the temperature of the bulk material supplied through said material inlet and to the throughput of said bulk material through said vessel such that the bulk material withdrawn through said material outlet has a temperature corresponding to a target temperature value;

wherein the temperature of the heat transfer gas introduced through said gas inlet is regulated in response to a temperature measurement from a temperature sensor which measures the temperature of said bulk material in a lower region of said vessel through which the heat transfer gas does not pass.

2. A method according to claim 1, wherein said bulk material is a granular plastic material.

3. A method according to claim 1, wherein said heat transfer gas is conveyed through said vessel cocurrently with said bulk material.

4. A method according to claim 1, wherein said heat transfer gas is conveyed through said vessel countercurrently to said bulk material.

5. A method according to claim 1, wherein said vessel is dynamically insulated by passing heat transfer gas leaving said vessel through a jacket surrounding said vessel.

* * * * *